Oct. 8, 1929.                J. WERZ                1,730,989
            ELECTRIC VEHICLE DRIVE THROUGH DOUBLE GEARING
                    Filed Dec. 14, 1926        2 Sheets-Sheet 1
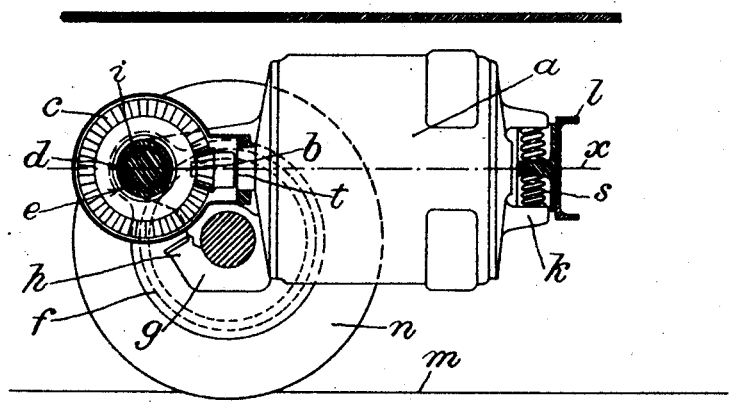
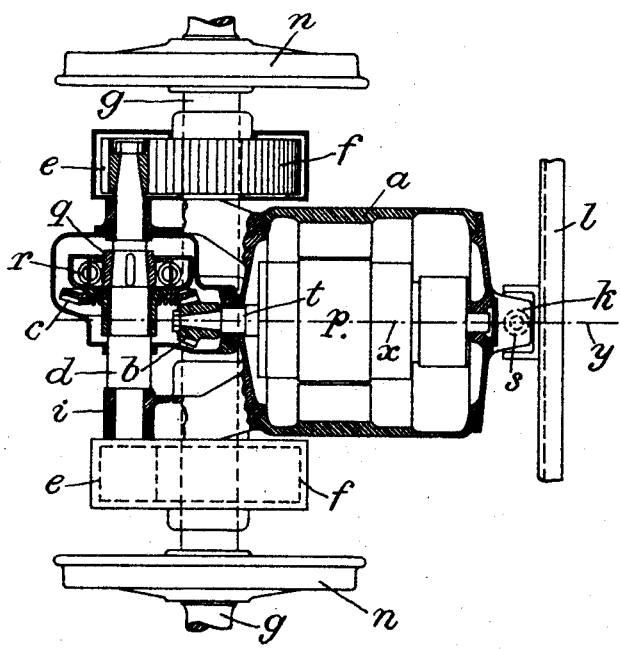

Oct. 8, 1929.  J. WERZ  1,730,989
ELECTRIC VEHICLE DRIVE THROUGH DOUBLE GEARING
Filed Dec. 14, 1926  2 Sheets-Sheet 2

Patented Oct. 8, 1929

1,730,989

UNITED STATES PATENT OFFICE

JACOB WERZ, OF GENEVA, SWITZERLAND, ASSIGNOR TO SOCIETE ANONYME DES ATELIERS DE SECHERON, OF SECHERON, SWITZERLAND, A CORPORATION OF SWITZERLAND

ELECTRIC VEHICLE DRIVE THROUGH DOUBLE GEARING

Application filed December 14, 1926, Serial No. 154,740, and in Germany January 13, 1926.

This invention relates to improvements in electric drives for vehicles with double gearing, in which the motor is supported on the driving axle on bracket bearings and is also suspended to the car frame.

According to the invention, the electric vehicle drive is characterized by the axis of the driving motor lying in the direction of the longitudinal axis of the vehicle; by the gearing which is next to the motor being constituted by a bevel gear and finally by the gearing next to the driving axle, being constituted by one or more spur wheel gears, for the purpose of obtaining the highest possible gear ratio, not limited by the motor diameter, with the least amount of space required by the gearing in the direction of the longitudinal axis of the vehicle.

Two constructions of the electric drive according to the invention are illustrated by way of examples in the accompanying drawing in which:

Figure 1 is a vertical longitudinal section and

Figure 2 a plan, partly in section of a first construction.

Figure 3:
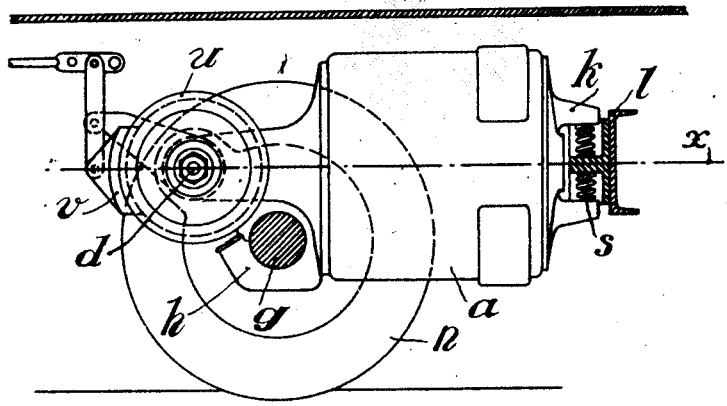

Figure 3 is a side elevation and

Figure 4:
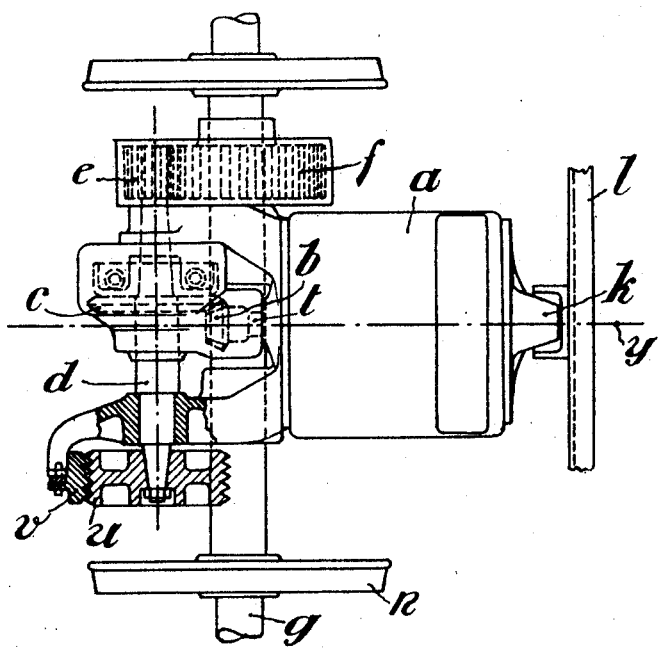

Figure 4 a top view partly in section of the second construction.

The electric motor $a$ according to Figs. 1 and 2, is so arranged that its horizontal axis $x$ is parallel to the longitudinal axis $y$ of the vehicle and above the driving axle $g$. It rests on two bearings $h$ on the said driving axle $g$ and is connected to the car frame $l$ by springs $s$. It drives a countershaft supported in bearings $i$ in the motor casing, through a bevel gear $b$, $c$, the pinion $b$ of which is keyed to its shaft $t$. The countershaft $d$ drives the driving axle $g$ through two symmetrical spur wheels $e, f$, of which the pinions $e$ are mounted on the countershaft $d$.

As the motor $a$ is mounted on bearings $h$ on the driving axle $g$, and the countershaft $d$ is mounted on the motor $a$, a proper meshing both of the bevel wheels and of the spur wheels is ensured.

Motor sets with double gearing hitherto used for electrically propelled vehicles, have parallel motor shafts and driving axles. When using small driving wheels, which is highly desirable for providing a low boarding platform, for instance in tram vehicles, it is not always possible, even when using double gearing, to obtain the high gear ratio required for the proper utilization of the motor, as the axle gear wheel may be made only as large as is allowed by railway regulations with regard to the clearance from the top of the rail.

It results from the geometry of toothed wheel gears, that in the arrangements hitherto used, the greatest possible gear ratio for a given driving wheel diameter and for a given speed of travel, can be the greater the smaller the diameter of the motor, that is to say the gear ratio depends on the external diameter of the motor. This dependence of the gear ratio on the diameter of the motor is due to the fact that in the usual arrangement, the countershaft is outside the motor casing. Assuming a certain thickness of the axle, the distance between the centres of the motor and counter shaft may be determined, and again assuming the greatest possible diameter of the gear wheel, also the diameter of the pinion, and therefore the ratio may be determined.

It is now obvious from the drawing that the gear ratio is independent of the diameter of the motor, and that the gearing takes up little space in the longitudinal direction of the vehicle, which is more particularly of great importance in the case of bogie trucks on account of the usually small wheel base.

Further is the space room occupied by the drive on both sides of the driving axle as small as possible.

As already stated, the motor $a$ is suspended on springs on the car frame at $k$, and its support on the driving axle $g$ is rigid. Any shocks transmitted from the track $m$ to the driving wheels $n$ therefore are not only felt on the motor casing, but also cause a relative turning of the motor about its point of support on the driving axle $g$. This results however in a turning of the countershaft $d$ and of the motor shaft $t$, as the gear wheels $f$ keyed to the driving axle $g$ mesh with the pinions $e$. A rolling of the pinions $e$ on the gear wheels $f$ must therefore necessarily take place. These shocks producing a variation of the angular velocity, are absorbed by a spring coupling acting in the circumferential direction. The large wheel $c$ of the bevel gear $b, c$, is mounted on the countershaft $d$ so that it can rotate to a certain angle, and connected by springs $r$ to a driver abutment $q$ secured to the countershaft $d$.

The bevel wheels can be replaced by helical wheels.

The spur gearing between the driving axle $g$ and the countershaft $d$ may be on one side only.

The damping spring coupling $r, q$ can be replaced by a slip clutch or some other suitable device which can be mounted at any desired point between the motor shaft and the driving axle.

The axis of the motor may also be in the plane which contains the geometrical axis of the driving axle or below this plane: it may be inclined with reference to said plane.

The countershaft of the spur wheels may be provided with a braking device; in this manner a good braking effect may be obtained: If the wheels of the driving axle are acted upon for the braking, the braking effect is not always the wanted one on account of the form, the wear and the dirtiness of the rolling surfaces of said wheels; in the case the motor shaft is acted upon, the braking effect is also not a good one, as said shaft too rapidly rotates.

In accordance with Figs. 3 and 4 the braking device is arranged as follows: A drum $u$ is keyed on the countershaft $d$ which is provided with one spur wheel $e$ only; with said drum $u$ one brake member $v$ engages in order to obtain the braking effect on the driving axle $g$.

The braking device may be a mechanical, a pneumatic, an electrical one. It may be provided at any place and also at both ends of the countershaft $d$. It may be arranged as an inner or outer brake.

I claim:

1. In an electric vehicle drive the combination, with a motor resting on bracket bearings on the driving axle and suspended to the car frame, of the axis of the driving motor being arranged in the direction of the longitudinal axis of the vehicle, a double gear between the motor and the driving axle, the gearing situated next to the motor being constituted by a bevel gear and the gearing next to the driving axle being constituted by one spur wheel, means being provided for absorbing the shocks transmitted from the driving axle through the gearing to the motor shaft.

2. In an electric vehicle drive the combination, with a motor resting on bracket bearings on the driving axle and suspended to the car frame, of the axis of the driving motor being arranged in the direction of the longitudinal axis of the vehicle, a double gear between the motor and the driving axle, the gearing situated next to the motor being constituted by a bevel gear and the gearing next to the driving axle being constituted by one spur wheel, a device being provided for braking the countershaft on which the spurwheel is seated.

3. In an electric vehicle drive the combination, with a motor resting on bracket bearings on the driving axle and suspended to the car frame, of the axis of the driving motor being arranged in the direction of the longitudinal axis of the vehicle, a double gear between the motor and the driving axle, the gearing situated next to the motor being constituted by a bevel gear and the gearing next to the driving axle being constituted by one spur wheel and being located with reference to the driving axle on the side opposite to that on which the motor is situated.

4. In an electric vehicle drive the combination, with a motor resting on bracket bearings on the driving axle and suspended to the car frame, of the axis of the driving motor being arranged in the direction of the longitudinal axis of the vehicle and above the driving axle, a double gear between the motor and the driving axle, the gearing situated next to the motor being constituted by a bevel gear and the gearing next to the driving axle being constituted by one spur wheel for the purpose of obtaining the highest possible gear ratio not limited by the motor diameter and requiring the smallest possible space for the gearing in the direction of the longitudinal axis of the vehicle.

5. In an electrical vehicle drive, a drive shaft, a motor mounted in a frame journaled at one end on the drive shaft and yieldingly mounted at the other end in the vehicle frame, the axis of the motor being arranged in the direction of the longitudinal axis of the vehicle with the motor at one side of the drive shaft, a counter shaft journaled in bearings in the motor frame at the other side of the drive shaft, beveled gears connecting the motor shaft and the counter shaft, and spur gears connecting the counter shaft and the drive shaft.

6. In an electric vehicle drive, a drive shaft, a motor mounted in a frame journaled at one end on the drive shaft and yieldingly mounted at the other end in the vehicle frame, the axis of the motor being arranged in the direction of the longitudinal axis of the vehicle, a counter shaft journaled in bearings on the motor frame, a single set of meshing bevel gears, one of which is fixed on the motor shaft and the other on the counter shaft, and spur gears connecting the counter shaft and the drive shaft whereby the rotary motion of the motor shaft in either direction is transmitted through said bevel and spur gears to turn the drive shaft in either direction.

In testimony whereof I have affixed my signature.

JACOB WERZ.